United States Patent
Farag et al.

(10) Patent No.: US 9,291,880 B2
(45) Date of Patent: Mar. 22, 2016

(54) MOBILE DEVICE LIGHT METER ATTACHMENT

(71) Applicants: Abraham Farag, Palo Alto, CA (US); Ricardo Penate, Pacifica, CA (US); Vijay Koneru, Los Angeles, CA (US); Shane Lewis Washburn, Oakland, CA (US); James Flynn, San Francisco, CA (US); Kelvin Louie Leung, Mountain View, CA (US)

(72) Inventors: Abraham Farag, Palo Alto, CA (US); Ricardo Penate, Pacifica, CA (US); Vijay Koneru, Los Angeles, CA (US); Shane Lewis Washburn, Oakland, CA (US); James Flynn, San Francisco, CA (US); Kelvin Louie Leung, Mountain View, CA (US)

(73) Assignee: Spark Facter Design, Palo Alto, CA (US)

( * ) Notice: Subject to any disclaimer, the term of this patent is extended or adjusted under 35 U.S.C. 154(b) by 26 days.

(21) Appl. No.: 14/168,094

(22) Filed: Jan. 30, 2014

(65) Prior Publication Data

US 2014/0211085 A1 Jul. 31, 2014

Related U.S. Application Data

(60) Provisional application No. 61/758,367, filed on Jan. 30, 2013.

(51) Int. Cl.
*H04N 5/225* (2006.01)
*G03B 17/56* (2006.01)
*G03B 11/04* (2006.01)
*G03B 11/06* (2006.01)

(52) U.S. Cl.
CPC .............. *G03B 17/565* (2013.01); *G03B 11/04* (2013.01); *G03B 11/041* (2013.01); *G03B 11/043* (2013.01); *G03B 11/06* (2013.01); *H04N 5/2251* (2013.01); *H04N 5/2254* (2013.01)

(58) Field of Classification Search
CPC .... G03B 17/565; G03B 11/04; G03B 11/041; G03B 11/043; H04N 5/2254; H04N 5/2251
USPC .................................................. 348/370–376
See application file for complete search history.

(56) References Cited

U.S. PATENT DOCUMENTS

| | | | | |
|---|---|---|---|---|
| 3,819,856 A * | 6/1974 | Pearl | ................ | G08B 13/19619 348/151 |
| 2002/0060745 A1* | 5/2002 | Bowden | ............ | G08B 13/1963 348/373 |
| 2004/0125215 A1* | 7/2004 | Wallace | ..................... | 348/223.1 |
| 2010/0290773 A1* | 11/2010 | Ichimiya | ....................... | 396/111 |
| 2011/0158637 A1* | 6/2011 | Jung | ..................... | G03B 15/03 396/535 |
| 2013/0272690 A1* | 10/2013 | Aoki | ..................... | G03B 7/095 396/257 |

FOREIGN PATENT DOCUMENTS

JP 2004072436 A * 3/2004

* cited by examiner

*Primary Examiner* — Yogesh Aggarwal
(74) *Attorney, Agent, or Firm* — Larisa Migachyov

(57) ABSTRACT

Incident light filter or cap assembly adapted to be attached to a mobile device equipped with a camera and software to measure light levels.

14 Claims, 4 Drawing Sheets

MOBILE DEVICE LIGHT METER ATTACHMENT

CROSS-REFERENCE TO RELATED APPLICATIONS

The present application relates to, and takes priority from, U.S. Provisional Application No. 61/758,367, filed Jan. 30, 2013, which is hereby incorporated by reference.

BACKGROUND

1. Field of the Invention

The present invention relates to the field of photography and lighting. More particularly, the present invention relates to the field of mobile device attachments for measuring light intensity.

2. Background of the Invention

To determine the appropriate exposure settings for a photograph, the lighting conditions under which the photograph is taken needs to be measured. A photographer might use one of two different types of light meters to make this measurement: a) a reflected light meter, or b) an incident light meter.

Reflected light meters are typically stand-alone handheld devices or integrated into a camera. The reflected light meters built into most modern cameras can measure the amount of light reflected off of the subject and background scene and into the camera.

Incident light meters are usually a stand-alone handheld device. The typical usage of an incident light meter is to place the meter near the subject and taking a measurement. The light projected onto the meter is the incident light.

Measurement by reflected light using a reflected light meter is far more convenient and expedient and, in most cases, adequate for determining the appropriate exposure settings. However, when a scene contains a more than or less than an average amount of light, the use of a reflected light meter can result in a photograph that is underexposed or overexposed. In such cases, an incident light meter typically provides better exposure results. A photographer can place an incident light meter on the same plane as the subject to be photographed to measure the amount of actual light incident on the subject. This light measurement would then be used to determine exposure settings that are more appropriate than those that would be obtained through the use of a reflected light meter.

It can be seen that reflected light meters and incident light meters each have advantages and disadvantages. A reflected light meter can be built in to a camera, thus freeing the photographer from the need to carry an additional piece of equipment. A camera with a built-in reflected light meter can use the light level measurements made by the reflected light meter to make an automated determination of the appropriate exposure settings. However, the light level measurements made by a reflected light meter may not provide the most appropriate exposure settings when a photographed scene contains challenging light conditions.

An incident light meter, on the other hand, can take light level measurements that result in exposure settings that are correct under a broader range of lighting conditions. However, a photographer using an incident light meter typically needs to carry an additional piece of equipment and may need to manually determine the exposure settings based on the measurements made by the incident light meter.

Digital cameras are sometimes included in multi-function or telecommunication devices such as mobile phones, smart phones, personal digital assistants, tablet devices, laptop computers, or other similar portable electronic devices. Any such device will hereinafter be referred to as a mobile telecommunications device or simply, a mobile device.

Since mobile devices are ubiquitous in today's society, a device that enables a photographer to use a mobile device camera as an incident light meter is therefore desirable. It may also be desirable for a non-photographer to use an incident light meter, for example, to measure the ambient light in an office or home environment.

SUMMARY OF THE INVENTION

An object of the present invention is to provide an attachment to a mobile device that enables the mobile device camera to act as an incident light meter.

Another object of the present invention is to reduce the number of objects that a photographer needs to carry.

In one of its embodiments, the invention comprises a translucent cap that is placed in front of a camera on a mobile device and held there securely by a mount that attaches to the mobile device. The cap may be hemispherical (to let in more light), flat (for a narrower field of view), or any other shape. While it is preferably white, the cap may be any color. It is preferably large enough to cover the camera without blocking it. No light should be able to enter between the cap and the body of the mobile device.

The mount may attach to the mobile device by friction fit (i.e. by being just narrow enough that the edge of the device will be able to fit inside), or by a spring-loaded arm that presses against the mobile device. It may be designed for a particular mobile device, and have the cap in the right place for that mobile device's camera, or it may be universal and have enough freedom to move so that it can be used for any mobile device and any camera position. The mount may also comprise two caps for devices that have two cameras, or it may specifically leave the other camera on a two-camera device free.

The mobile device may comprise an app that is designed for measuring light intensity of incident light. Such an app may also comprise a module that shows the user what camera settings to use depending on light intensity.

DETAILED DESCRIPTION OF THE PREFERRED EMBODIMENT

Figure 1:
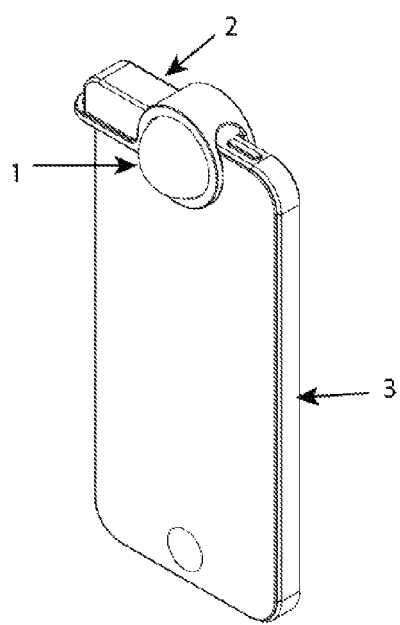
FIG. 1 shows the mobile device attachment of the present invention attached to a mobile device and covering the internal camera lens.
Figure 2:
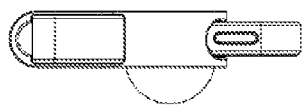
FIG. 2 shows two other views of the mobile device attachment of the present invention.
Figure 2:
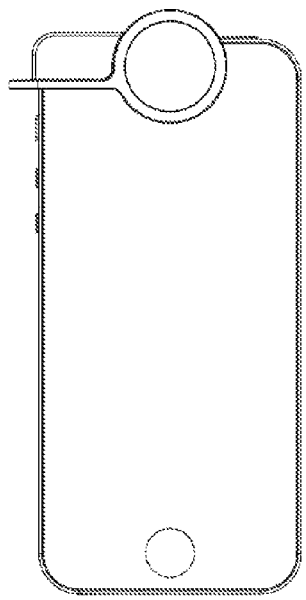
Figure 3:
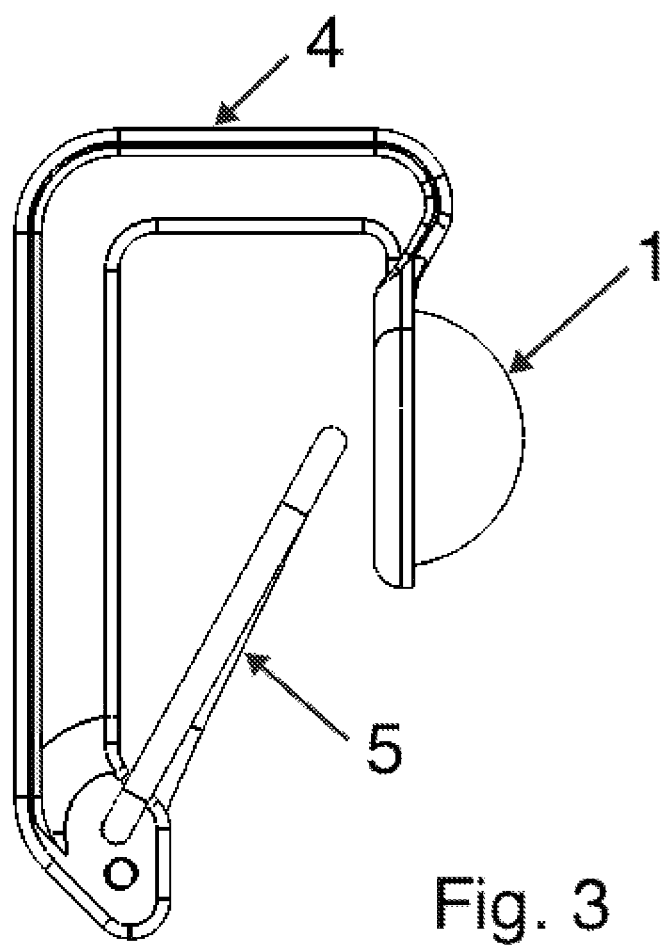
FIG. 3 shows an alternate embodiment of the mobile device attachment of the present invention, comprising a spring mount.

FIG. 1 shows a view of the preferred embodiment of the present invention, attached to a mobile phone 3. FIGS. 2 and 3 show two other views of the same embodiment of the invention. Cap 1 is a dome-shaped lens made of a translucent material that allows diffused light to penetrate, and it is preferably located directly over the camera of the mobile phone 3. Mount 2 enables the present invention to be securely attached to the mobile phone 3. The mobile phone preferably has an app installed that enables it to measure the intensity of incident light.

Cap 1 is preferably hemispherical in shape to allow it to gather light from a wide angle. This gives the camera a large aggregated sample of diffused light to measure the total amount of light in a given environment. Other shapes are also allowed as long as they allow a large aggregated sample of diffused light to filter through the cap to the camera.

While preferably, cap 1 is made of a white translucent material, it may also be made of a colored translucent material of any color. This may be useful for some photographic applications.

In an alternate embodiment (not shown), the cap 1 is a flat disk that covers the mobile device camera. This enables the camera to receive light from a narrow angle in a specific direction. This is useful for applications where it is important to measure the light coming from a specific direction rather than overall light levels.

The mount 2 is designed to hold the cap 1 over the camera lens firmly and securely, in such a way that no light penetrates between the cap and the device. The camera should only see the light that is transmitted through the cap, as unfiltered light would cause erroneous readings. The mount 2 is also preferably made of an opaque material that blocks the transmission of light, so that the cap 1 is the only light transmitter.

The mount 2 is preferably, but not necessarily, permanently connected to the cap 1. In the preferred embodiment, the mount 2 and the cap 1 form an assembly that can be attached and detached from the mobile device as a unit. In another embodiment, several different types of cap 1 may exist (a hemispherical one, a flat one, a colored one, etc.) and may be interchangeable.

The mount 2 preferably attaches to the mobile device in a removable manner in such a way that it does not damage the mobile device. In the embodiment shown in FIGS. 1-3, the mount 2 attaches to the mobile device by friction fit over the edge of the device. The mount 2 is preferably lined with a soft non-scratch material to prevent scratches to the device and to improve friction.

If used with devices that have two cameras, the mount 2 preferably does not cover the second camera. In an alternate embodiment (not shown), the mobile device attachment comprises two caps, one for each camera in a two-camera mobile device. This would enable such a mobile device to simultaneously measure light levels in two directions with the two cameras.

Figure 4:
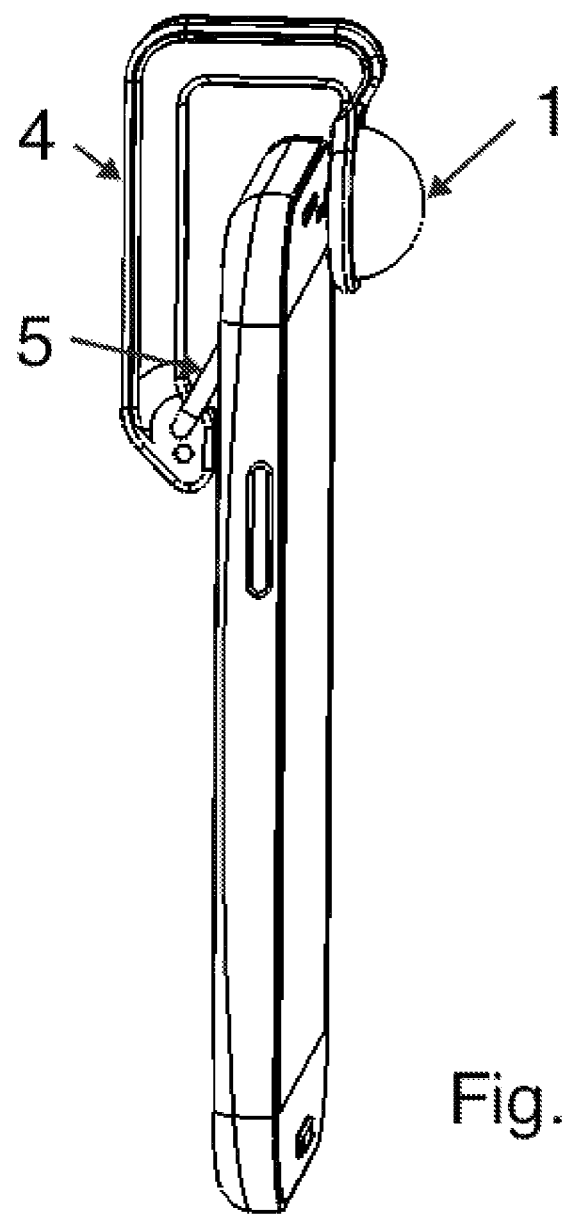
FIG. 4 shows the alternate embodiment of the mobile device attachment of the present invention attached to a mobile phone.
Figure 5:
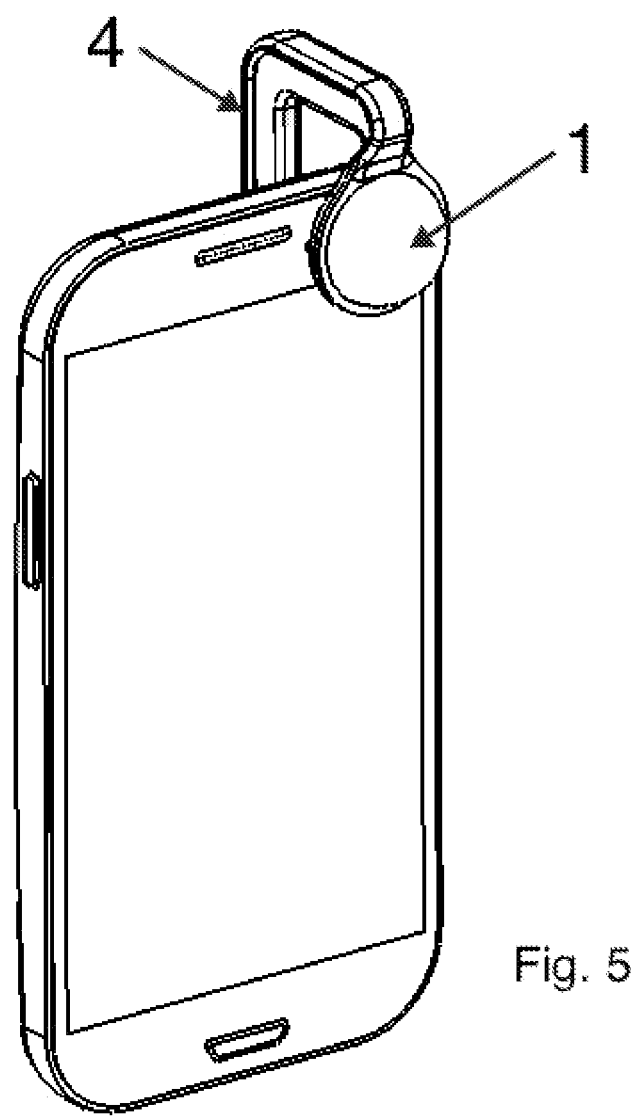
FIG. 5 shows another view of the alternate embodiment of the mobile device attachment of the present invention, attached to a mobile phone.

Since this embodiment fits on the mobile device by friction, different models must be made for each type of mobile device. An alternate embodiment, shown in FIGS. 3-5, is more universal. The same type of cap 1 is used as in the other embodiment, but the mount comprises a bracket 4 that is wider than most typical models of mobile devices, and a spring-loaded arm 5 that provides pressure against the back of a mobile device when the mobile device attachment is in use. Preferably, the spring-loaded arm 5 has a high-friction material on its tip to improve attachment, and any parts of the mount that contact the mobile device are preferably made of, or lined with, a material that does not scratch or damage the device.

While the FIGS. 3-5 show a spring-loaded arm as the element that provides pressure to the back of the device, any other flexible element may be used. For example, an inflatable ball may be used to provide enough pressure against the back of the device.

The mount preferably is wide enough to allow the mobile device attachment to accommodate different mobile device camera placements.

The mobile device preferably has an app installed that enables it to measure the amount of incident light received by the camera and to display it for the user. This may be used to simply measure the amount of ambient light in a particular location, or it may be used for photography. The app may also be used to measure the color temperature of ambient light and indicate the measured results in degrees Kelvin. When used for photography, the app may allow for calibration of light readings to adjust exposure; in an embodiment, the app may be able to measure the amount of infrared light received by the camera for the calibration of infrared film exposure. In an embodiment, the app also recommends camera settings for the user, including but not limited to ISO, aperture, and shutter speed, based on measured incident light. By locking any two settings according to user input, the app can adjust the exposure with the remaining setting; in an embodiment, the app can also "lock in" recommended settings. Preferably, the app should be able to determine whether the mobile device attachment is attached to the mobile device, and may be able to turn on automatically when the mobile device attachment is attached.

The invention claimed is:

1. A mobile device attachment for a mobile device with a camera, wherein the mobile device comprises a front side and a back side, comprising:
   a hemispherical cap made of a translucent material;
   a mount comprising a bracket that removably attaches to the mobile device in such a way that the cap covers the camera in such a way that no light can enter between the cap and the camera, wherein the mount attaches to the mobile device by friction fit, wherein the mount contacts both the front side and the back side of the mobile device.

2. The mobile device attachment of claim 1, where the cap is colored a color other than white.

3. The mobile device attachment of claim 1, where the mount further comprises high-friction material that contacts the mobile device when the mobile device attachment is installed.

4. The mobile device attachment of claim 1, where the mount attaches to the mobile device by a spring-loaded arm that presses against the back side of the mobile device.

5. The mobile device attachment of claim 1, where the mount is made in such a way as to accommodate different shapes of mobile devices, where the mobile device is selected from a group comprising smartphones and tablets.

6. The mobile device attachment of claim 1, where the mount is made in such a way as to accommodate a mobile device in a protective case.

7. The mobile device attachment of claim 1, where the cap is permanently attached to the mount.

8. The mobile device attachment of claim 1, where the cap is removably attached to the mount.

9. A mobile device attachment for a mobile device with a first camera and a second camera, comprising:
   a first cap made of a translucent material;
   a mount that removably attaches to the mobile device in such a way that the cap covers the camera in such a way that no light can enter between the cap and the camera;
   a second cap made of a translucent material;
   where the mount removably attaches to the mobile device in such a way that the cap covers the first camera and the second cap covers the second camera.

10. A system for measuring incident light intensity, comprising:
- a mobile device, said mobile device selected from a group comprising a smartphone and a tablet, comprising a camera and an app that measures incident light levels;
- the mobile device attachment of claim 1.

11. The system of claim 10, where the app recommends camera settings based on measured incident light levels.

12. The system of claim 11, where the camera settings comprise ISO, aperture, and shutter speed.

13. The system of claim 10, where the app measures incident infrared light levels.

14. The system of claim 10, where the app measures incident light color temperature.

\* \* \* \* \*